United States Patent
Galletti et al.

(10) Patent No.: US 8,105,190 B2
(45) Date of Patent: Jan. 31, 2012

(54) PULLEY ASSEMBLY WITH AN IMPROVED CLUTCH FOR A CONTINUOUSLY VARIABLE TRANSMISSION

(75) Inventors: Alessio Galletti, Soiana (IT); Paolo Seta, Ivrea (IT)

(73) Assignee: Dayco Europe S.r.l., Frazione Scalo (IT)

( * ) Notice: Subject to any disclaimer, the term of this patent is extended or adjusted under 35 U.S.C. 154(b) by 706 days.

(21) Appl. No.: 11/996,276

(22) PCT Filed: Jul. 18, 2006

(86) PCT No.: PCT/IB2006/001965
§ 371 (c)(1),
(2), (4) Date: Oct. 24, 2008

(87) PCT Pub. No.: WO2007/010360
PCT Pub. Date: Jan. 25, 2007

(65) Prior Publication Data
US 2009/0111623 A1  Apr. 30, 2009

(30) Foreign Application Priority Data
Jul. 19, 2005  (IT) .................. TO2005A0495

(51) Int. Cl.
F16H 59/00  (2006.01)

(52) U.S. Cl. ......... 474/13; 474/14; 474/15; 192/105 CD

(58) Field of Classification Search ............... 474/8, 13, 474/14, 15, 46, 47; 192/105 CD, 30 V
See application file for complete search history.

(56) References Cited

U.S. PATENT DOCUMENTS

| | | | | |
|---|---|---|---|---|
| 2,361,898 A * | 10/1944 | Ferguson et al. | ............... | 192/75 |
| 4,345,664 A | 8/1982 | Anno et al. | | |
| 4,575,363 A * | 3/1986 | Burgess et al. | ................. | 474/14 |
| 4,813,921 A * | 3/1989 | Dianda | ............................. | 474/8 |
| 4,830,163 A | 5/1989 | Miyazaki et al. | | |
| 6,478,702 B2 * | 11/2002 | Borghi et al. | .................... | 474/37 |
| 6,537,166 B1 * | 3/2003 | Adriaenssens et al. | ........... | 474/8 |
| 6,575,284 B2 * | 6/2003 | Chen et al. | ............. | 192/105 CD |
| 7,172,523 B2 * | 2/2007 | Borghi | ............................ | 474/13 |
| 7,234,581 B2 * | 6/2007 | Tsuchiya et al. | ........ | 192/105 CD |
| 2004/0082415 A1 * | 4/2004 | Borghi | ............................ | 474/13 |

FOREIGN PATENT DOCUMENTS

| | | |
|---|---|---|
| AT | 342986 | 9/1988 |
| EP | 0898096 | 2/1999 |
| EP | 1544435 | 6/2005 |

* cited by examiner

*Primary Examiner* — Emmanuel M Marcelo
(74) *Attorney, Agent, or Firm* — Fish & Richardson P.C.

(57) ABSTRACT

A pulley assembly for a continuously variable transmission in a vehicle, comprising a shaft having an axis, a supporting element rotatable about said axis, a first half pulley rigidly and rotationally connected to said supporting element, a second half pulley facing said first half pulley for defining a seat adapted to accommodate a belt of the transmission, at least one of the first and second half pulleys being longitudinally mobile with respect to the supporting element, and a clutch comprising a second supporting element connected to the shaft, a drum connected to the supporting element and accommodating the second supporting element, and a plurality of friction elements hinged to the second supporting element about respective hinge axes to selectively cooperate with the drum. In particular, the respective centres of gravity of said friction elements are located before the respective hinge axes with respect to a direction of rotation of the shaft which defines a forward running condition of the vehicle.

11 Claims, 2 Drawing Sheets

PULLEY ASSEMBLY WITH AN IMPROVED CLUTCH FOR A CONTINUOUSLY VARIABLE TRANSMISSION

CROSS REFERENCE TO PRIOR APPLICATIONS

This application is the U.S. national phase of International Application No. PCT/IB2006/001965, filed Jul. 18, 2006, which claims priority from Italian Patent Application No. TO2005A000495, filed Jul. 19, 2005, the disclosures of both are incorporated herein by reference in their entirety. The International Application was published in English on Jan. 25, 2007 as WO 2007/010360 under PCT Article 21(2).

TECHNICAL FIELD

The present invention relates to a pulley assembly with an improved clutch for a continuously variable transmission.

BACKGROUND ART

A continuously variable transmission comprises a first pulley assembly connected to an internal combustion engine, a second pulley assembly connected to the vehicle wheels and a belt wound between the two pulley assemblies.

Each assembly generally comprises a shaft connected to the engine or to the wheels, a supporting element driven by the shaft, and a pair of half pulleys rigidly and rotationally connected to the supporting element and reciprocally mobile along the rotatable supporting element to define the transmission ratio.

According to the various transmission configurations, one of the two pulley assemblies also comprises a clutch for selectively coupling the shaft to the supporting element for driving the half pulleys.

Continuously variable transmissions are applied to scooters and, thanks to the increased transmissible power, also to other vehicles, such as three- or four-wheel vehicles or snowmobiles.

However, the driving modes of a four-wheel vehicle are different from those of a scooter and in particular a need to fully exploit exhaust brake is felt.

DISCLOSURE OF THE INVENTION

It is therefore the object of the present invention to allow the effective exploitation of exhaust brake in continuously variable transmissions.

The object of the present invention is obtained by means of a pulley assembly with an improved clutch for a continuously variable transmission.

BRIEF DESCRIPTION OF THE DRAWINGS

For a better understanding of the present invention, a preferred embodiment will now be described only by way of non-limitative example, and with reference to the accompanying drawing, in which.

BEST MODE FOR CARRYING OUT THE INVENTION

Figure 1:
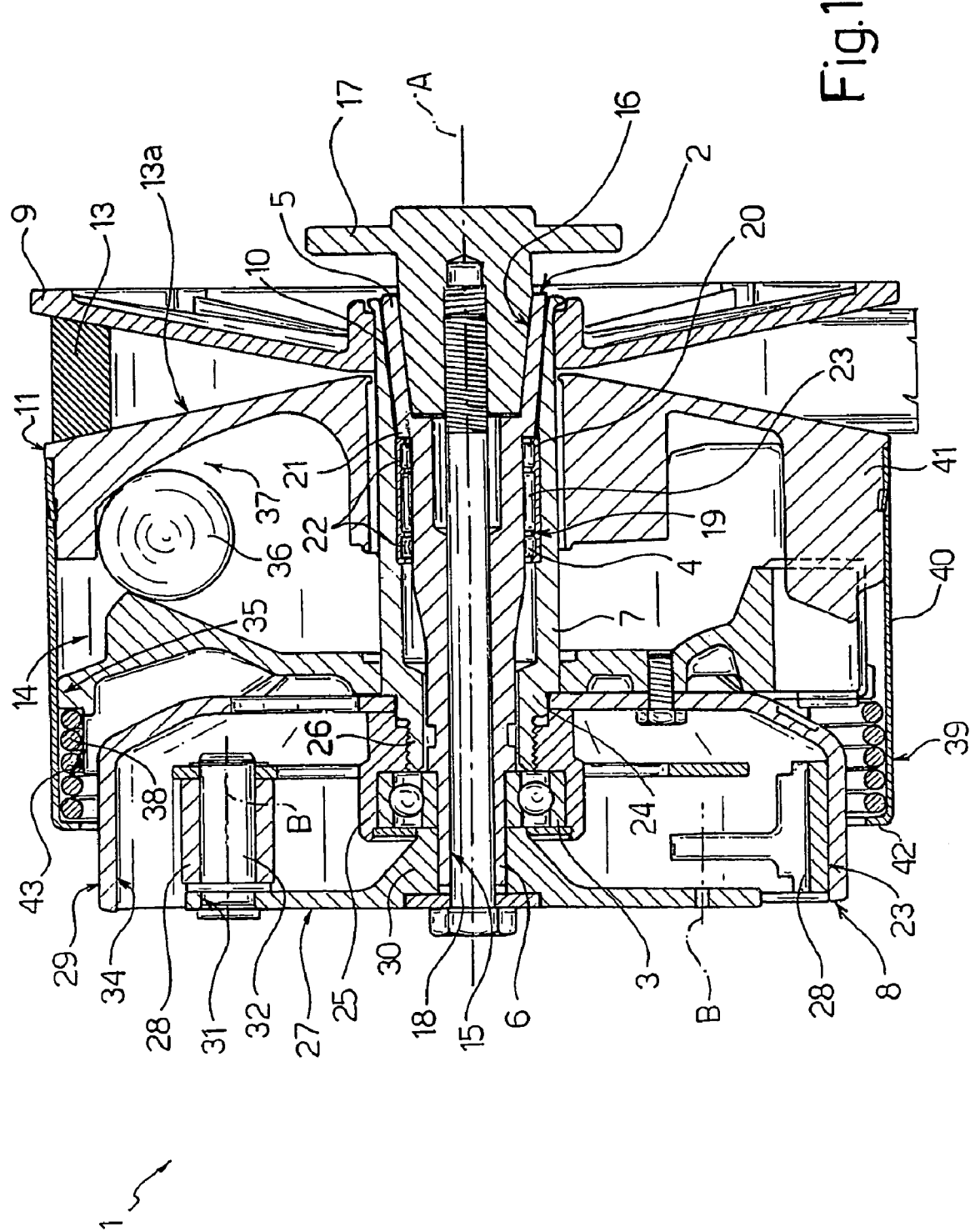
FIG. 1 is an axial section of a pulley assembly according to the present invention.

In FIG. 1, number 1 indicates a pulley assembly for a continuously variable transmission.

Assembly 1 comprises a connection shaft 2 rotatable about an axis A and having an end portion 5 adapted to be rigidly connected to a driving shaft of an internal combustion engine (not shown), a ball bearing 3 and a freewheel support 4 arranged on connection shaft 2, and a sleeve 7 concentrically supported on connection shaft 2 by means of ball bearing 3 and freewheel support 4.

Furthermore, pulley assembly 1 comprises on the opposite side of the end portion 5, a centrifugal clutch 8 for rotationally coupling an end portion 6 of connection shaft 2 to sleeve 7, a fixed half pulley 9 rigidly connected to an end portion 10 of sleeve 7 axially opposite to centrifugal clutch 8, and a mobile half pulley 11 sliding on sleeve 7 between fixed half pulley 9 and centrifugal clutch 8.

Fixed and mobile half pulleys 9, 11 define a seat 13a accommodating a belt 13 for transferring power from the engine to a driven pulley assembly (not shown) connected to the wheels, and the axial position of mobile half pulley 11 is automatically defined by a centrifugal control device 14 regardless of the angular speed of sleeve 7 to vary the transmission ratio according to known methods.

In greater detail, connection shaft 2 presents a longitudinal through hole 15 and defines, at the end portion 5, a conical seat 16 coaxial to axis A and accommodating a corresponding coupling portion of a flange 17 adapted to connect to the internal combustion engine and locked to the driving shaft 2 by a screw 18 accommodated in the through hole 15.

Next to end portion 5 towards centrifugal clutch 8, connection shaft 2 defines a supporting surface 19 for freewheel support 4 which comprises a cylindrical case 20 rigidly connected to sleeve 7 and two roller cages 22 accommodated within casing 20.

Freewheel support 4 further comprises in an integrated manner within casing 20, an overrunning joint 23 axially arranged between roller cages 22. Overrunning joint 23 defines a one-way locking device and allows relative rotation when driving shaft 2 turns faster than sleeve 7, and locks relative rotation when the speed of sleeve 7 exceeds that of connection shaft 2, considering the direction of rotation C shown in FIG. 2 which coincides with the direction of the engine and identifies a forward running condition of the vehicle.

From the opposite side with respect to flange 17, ball bearing 3 is shrinked on end portion 6 of driving shaft 2 and is locked in axial direction against a shoulder 24 of connection shaft 2 by means of screw 18.

Ball bearing 3 is accommodated within a removable portion 25 of sleeve 7, for example an appropriately dimensioned nut, and defines with freewheel support 4 a radial support for sleeve 7 on connection shaft 2.

Sleeve 7 is rotationally and disengageably connected to connection shaft 2 by means of centrifugal clutch 8 which comprises a plate support 27, a plurality of jaws 28 peripherally hinged to plate support 27, a plurality of springs 50 for reciprocally connecting the two adjacent jaws 28, and a drum 29 rigidly locked onto sleeve 7 by means of nut 25 and accommodating plate support 27.

In particular, the plate support 27 integrally comprises a hub 30 which accommodates end portion 6 of connection shaft 2 and is axially clamped against ball bearing 3 by means of screw 18.

Furthermore, plate support 27 defines a plurality of circumferentially and equally spaced holes accommodating respective pins 32 parallel to axis A and defining respective hinge axes B about which jaws 28 turn to selectively cooperate with drum 29.

Each jaw 28 presents a friction surface 33 having an appropriate bending radius for cooperating under the effect of centrifugal acceleration with an internal cylindrical surface 34 defined by drum 29 and arranged coaxially to axis A.

In particular, each jaw 28 presents a centre of gravity G in which the inertial forces generated by the centrifugal acceleration is concentrated, and such centre of gravity G is located before the respective pin 32 considering direction C defining a forward running condition of the vehicle and directed towards the direction of rotation of the engine. For example, if the crankshaft turns anti-clockwise facing from the pulley assembly towards the engine and the crankshaft is rigidly connected to shaft 2 of pulley assembly 1, direction C is anti-clockwise and follows the direction of rotation of the crankshaft.

Reference will be made to such assembly of jaws 28 hereinafter in the description and in the claims as a 'trailing direction' assembly.

Furthermore, the curving of friction surfaces 33 and the position of axes B are preferably designed so that a line of action of the friction forces between jaw 28 and drum 29 is arranged between relative axis B and internal cylindrical surface 34, obtaining an effect which will be better specified below.

Drum 29, when caused to turn by means of jaws 28, drives centrifugal control device 14 which comprises a guiding element 35 rigidly connected to drum 29 and a plurality of mobile rollers 36 encompassed in a compartment 37 defined by guiding element 35 itself on one side and by mobile half pulley 11 on the other.

Mobile rollers 36 are accommodated in specific radial grooves (not shown) carried both by guiding element 35 and by mobile half pulley 11 and in this way make sleeve 7 circumferentially integral with mobile half pulley 11.

Furthermore, propelling assembly 1 is provided with a spring 38 axially cooperating with guiding element 35 and a removable support 39 connected to mobile half pulley 11 and cooperating with spring 38 for spacing half pulley 11 from fixed half pulley 9.

In particular, removable support 39 comprises a cylindrical wall 40 having an axial end portion rigidly connected to a peripheral portion 41 of mobile half pulley 11. Removable support 39 extends towards centrifugal clutch 8 accommodating guiding element 35 and presents a radial edge 42 arranged on an opposite end with respect to mobile half pulley 11 and defining a stop facing axis A for spring 38, which is accommodated within cylindrical wall 40 between radial edge 42 and an annular seat 43 facing centrifugal clutch 8 of guiding element 35.

The operation of pulley assembly 1 is as follows.

When the internal combustion engine is stationary or idle, pulley assembly 1 is in an open position in which spring 38 maintains the half pulleys 9, 11 separate defining a maximum transmission/reduction ratio which is suitable for pickup.

After an engine acceleration, connection shaft 2 is rotationally driven and turns within sleeve 7 which is still stationary.

Connection shaft 2 continues to accelerate exceeding the engagement threshold over which jaws 28 open against the bias of springs 50 and contact the internal cylindrical surface 34 of drum 29 pushed by an approaching force generated by centrifugal acceleration.

Sleeve 7 and half pulleys 9, 11 are therefore driven by friction and, when running, the transmission ratio is varied by means of rollers 36 which are operated by the centrifugal acceleration and radially move on the guiding element 35 pushing the mobile half pulley 11 towards the fixed half pulley 9 against the bias of spring 38.

Exhaust brake condition may also occur while running, during which half pulleys 9, 11 exert driving torque on driving shaft 2 and the internal combustion engine resists such torque by slowing the vehicle down.

During exhaust brake condition, the direction of rotation does not change but torque is reversed and in the initial instants half pulleys 9, 11 tend to overrun the angular speed of supporting shaft 2.

Such effect is however prevented by overrunning joint 23 of the freewheel support 4 which is essentially and instantaneously applied thus locking the relative rotation between driving shaft 2 and half pulleys 9 and continuing to drive pulley assembly 1 at an angular speed determined by the vehicle speed and by the transmission ratio.

In this way, pulley assembly 1 allows to continuously cross the transient towards exhaust brake condition, avoiding annoying accelerators which would be generated if half pulleys 9, 11 could overrun engine speed.

Furthermore, centrifugal clutch 8 is maintained at angularly high speeds allowing to drive drum 29 by jaws 28 at least during a first step of the exhaust brake condition.

In order to maintain centrifugal clutch 8 engaged as long as possible during exhaust brake condition, spring 38 contributes to rapidly move away the fixed and mobile half pulleys 9, 11 reaching the minimum transmission ratio. Such ratio multiplies the number of revolutions of half pulleys 9, 11 with respect to that of the vehicle wheels maintaining pulley assembly 1 at a high angular speed also at relatively slow vehicle speed and thus increasing centrifugal acceleration.

In order to maintain centrifugal clutch 8 engaged as long as possible, jaws 28 are also mounted on plate support 27 in trailing direction. Indeed, during exhaust brake condition, the resultant of the friction forces acting on each jaw 28 faces the respective axis B and therefore generates a moment which tends to maintain jaw 28 against drum 29 because the line of action is located between axis B and the internal cylindrical surface 34. Such moment is added to the centrifugal force acting on jaw 28 thus defining a less sensitive approaching force to the angular speed of connection shaft 2. In this way, centrifugal clutch 8 is engaged for a speed range higher than that which may be obtained by a clutch whose jaws are fitted in the opposite, or leading, direction as occurs for example in scooters.

During a pickup step, instead, the resulting friction force is directed towards the opposite side of the respective axis B with respect to centre of gravity G and negligibly influences the approaching force, which during the pickup step is prevalently generated by centrifugal acceleration. In this way, centrifugal clutch 8 is engaged with an initial slipping and a smoother pickup more suitable for driving a four-wheel vehicle, particularly during parking manoeuvres.

Finally, if the exhaust brake condition is extended and an angular speed slower than a disengagement threshold is reached, centrifugal clutch 8 opens under the bias of springs 50.

Following the opening of centrifugal clutch 8, half pulleys 9, 11 remain still connected to driving shaft 2 by means of freewheel support 4 and the vehicle speed may still decrease until the user returns, by accelerating, the number of revolutions of connection shaft 2 to a value exceeding the engagement value of centrifugal clutch 8.

In theory, half pulleys 9, 11 may remain angularly fixed with connection shaft 2 until the engine reaches its minimum number of revolutions. However, such condition corresponds to an excessively slow vehicle speed which is not reached in practice.

A further aspect of the operation of pulley assembly 1 is shown considering the entire transmission assembly which connects the engine to the wheels.

In particular, pulley assembly 1 is directly secured to the internal combustion engine by means of flange 17 and drives, by means of the driven pulley assembly, a box comprising a differential for directly driving the wheels and a gearbox arranged between the driven pulley assembly and the differential having a neutral gear, a forward gear and a reverse gear.

In this case, it is important to observe how the direction of rotation of pulley assembly 1 is the same in forward and in reverse conditions since the engine is directly connected to shaft 2.

In idle condition, the wheels are disconnected from the engine and the accelerator pedal may be accidentally pressed, engaging centrifugal clutch 8 and turning both pulley assembly 1 and the driven pulley assembly.

As soon as the accelerator is released, the engine immediately returns to idle while the pulley assemblies tend to overrun connection shaft 2 due to the inertia acquired and induce clashing of the gears causing damage. However, the presence of the freewheel support 4 allows slowing down simultaneously with the engine of the entire variable transmission and a subsequent smooth forward gear engagement.

The advantages that the present pulley assembly 1 allows to obtain are as follows.

The use of a freewheel support element 4 between driving shaft 2 and half pulleys 9, 11 allows to use the exhaust brake aboard a vehicle provided with transmission assembly 1 avoiding either sudden, annoying accelerations during shift transients towards exhaust brake conditions or damage to the transmission after accidental acceleration in neutral.

Similarly, the trailing direction assembly of the jaws 28 allows to maintain for a longer time jaws 28 against the internal cylindrical surface 34 of the drum 29, and therefore to apply less stress to the brakes.

Furthermore, during pickup, trailing direction assembly of the jaws 28 makes pickup smoother and allows to operate with higher accuracy without tearing, thus improving maneuverability, for example while parking.

Furthermore, spring 38 allows to reach the opening position of the half pulleys 9, 11 faster thus decreasing the response time of the pulley assembly during exhaust brake condition.

It is finally apparent that changes and variations can be made to pulley assembly 1 here described and illustrated without departing from the scope of protection of the present invention, as defined in the accompanying claims.

In particular, the freewheel support may replace the ball bearing 3 and the support surface 19 may guide a simple roller cage.

Furthermore, it is possible to envisage that the profile of the friction surfaces 33 may be dimensioned so that axis B is arranged between the internal cylindrical surface 34 and the action line of the resulting friction force. In this case, a smooth pickup may be preserved but the speed range within which freewheel support 4 and centrifugal clutch 8 jointly transfer the driving torque from half pulleys 9, 11 to connection shaft 2 may be reduced because the centrifugal clutch tends to disengage at a higher revolution speed.

Continuously variable transmissions may present various configurations, and by the way of a further variant, it is possible to envisage a configuration in which both clutch 8 and freewheel support 4 are arranged on a single driven pulley assembly.

Furthermore, control device 14 may be different from that described, for example they may be automatically operated by means of an actuator controlled by an electronic control unit.

Also the half pulleys may be connected in variable manner to sleeve 7; in general, at least one of the two half pulleys 9, 11 must be rotationally connected to sleeve 7.

One-way locking device 23 may, for example, consist of an electronically controlled clutch.

Figure 2:
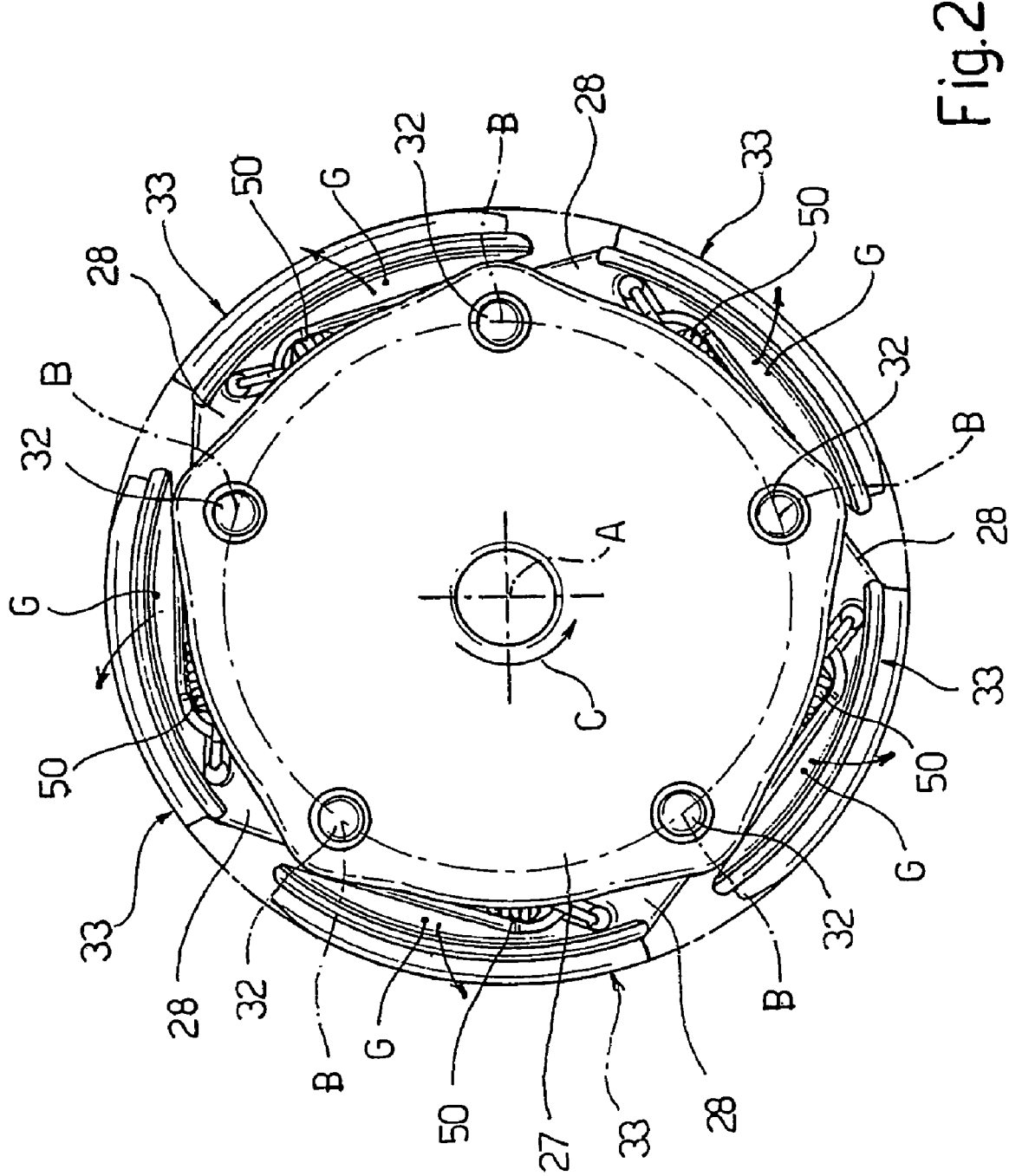
FIG. 2 is a left side view of FIG. 1 (not in scale).

In the exemplary embodiment described, forward running condition of the vehicle corresponds to anti-clockwise rotation of connecting shaft 2, as shown in FIG. 2. However, the direction of rotation of connecting shaft 2 may be clockwise when the vehicle is running forward, for example because a gear reducer is arranged between the internal combustion engine and pulley assembly 1. In this case, assembly of the jaws 28 will mirror the arrangement shown in FIG. 2.

The invention claimed is:

1. A pulley assembly for a continuously variable transmission in a vehicle, said pulley assembly comprising:
   a shaft having an axis,
   a supporting element rotatable about said axis,
   a first half pulley rotationally connected to said supporting element,
   a second half pulley facing said first half pulley for defining a seat adapted to accommodate a belt of said transmission,
   at least one of said first and second half pulleys being longitudinally mobile with respect to said supporting element, and
   a clutch comprising:
      a second supporting element connected to said shaft,
      a drum connected to said supporting element and accommodating said second supporting element, and
      a plurality of friction elements hinged to said second supporting element about respective hinge axes to selectively cooperate with said drum,
   wherein respective centers of gravity of said friction elements are located before the respective hinge axes with respect to a given direction of rotation of said shaft which defines a forward running condition of said vehicle such that each friction element is configured to rotate about the respective hinge axis to contact said drum with a rotating direction that is the same as said given direction of rotation to achieve a trailing mounting of said friction elements, and
   one-way coupling means arranged between said supporting element and said shaft to allow the driving of said shaft when the angular speed of said supporting element tends to exceed that of said shaft.

2. A pulley assembly according to claim 1, wherein said supporting element is a sleeve at least partially accommodating said shaft, the pulley assembly comprising rotatable supporting means radially arranged between said shaft and said sleeve.

3. A pulley assembly according to claim 2, wherein said one-way coupling means is integrated in said rotatable supporting means.

4. A pulley assembly according to claim 3, wherein said rotatable supporting means comprises a first and a second bearing and
   wherein said one-way coupling means is integrated on at least one of said first and second bearing.

5. A pulley assembly according to claim 3, wherein at least one of said first and second bearings comprises a roller cage.

6. A pulley assembly according to claim 1, wherein said one-way coupling means comprises at least one overrunning joint.

7. A pulley assembly according to claim 1 further comprising:
a biasing element cooperating with at least one of said first and second half pulleys for moving away said second half pulley from said first half pulley.

8. A pulley assembly according to claim 7, wherein said biasing element cooperates with a fixed element rigidly connected to said supporting element and with a support rigidly connected to a peripheral portion of said at least one of said first and second half pulleys.

9. A pulley assembly according to claim 1, wherein said second supporting element is rigidly connected to said shaft and wherein said drum is rigidly connected to said supporting element.

10. A pulley assembly according to claim 1 further comprising:
control means for regulating a longitudinal portion of said second half pulley, wherein said shaft comprises a coupling element adapted to be connected to a crankshaft of an internal combustion engine.

11. A pulley assembly according to claim 10, wherein said control means comprises a guiding element rigidly connected to said supporting element, a plurality of centrifugal elements mobile on said guiding element and cooperating with said second half pulley for defining the position of said second half pulley.

* * * * *

UNITED STATES PATENT AND TRADEMARK OFFICE
CERTIFICATE OF CORRECTION

PATENT NO. : 8,105,190 B2
APPLICATION NO. : 11/996276
DATED : January 31, 2012
INVENTOR(S) : Alessio Galletti It is certified that error appears in the above-identified patent and that said Letters Patent is hereby corrected as shown below:

Title page, Item (73) Assignee: Please delete "Frazione Scalo" and replace with -- Chieti --

Signed and Sealed this
Third Day of July, 2012

David J. Kappos
*Director of the United States Patent and Trademark Office*